United States Patent
Templeman

(10) Patent No.: US 9,616,460 B2
(45) Date of Patent: Apr. 11, 2017

(54) TERMINATE-ON-DEMAND CATIONIC POLYMERIZATION METHOD FOR FORMING A TWO-DIMENSIONAL COATING

(75) Inventor: Cynthia G. Templeman, Ypsilanti, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 1015 days.

(21) Appl. No.: 13/310,267

(22) Filed: Dec. 2, 2011

(65) Prior Publication Data
US 2013/0142962 A1 Jun. 6, 2013

(51) Int. Cl.
| | |
|---|---|
| B05D 3/06 | (2006.01) |
| B05D 3/02 | (2006.01) |
| C09D 4/00 | (2006.01) |
| B05D 7/14 | (2006.01) |

(52) U.S. Cl.
CPC .............. B05D 3/06 (2013.01); B05D 3/0209 (2013.01); C09D 4/00 (2013.01); *B05D 3/067* (2013.01); *B05D 7/14* (2013.01)

(58) Field of Classification Search
CPC ........ B05D 2/0209; B05D 2/06; B05D 3/067; B05D 7/14; C09D 4/00
USPC ........................................................ 427/493
See application file for complete search history.

(56) References Cited

U.S. PATENT DOCUMENTS

| | | | |
|---|---|---|---|
| 4,105,806 A * | 8/1978 | Watt | 427/511 |
| 5,650,261 A | 7/1997 | Winkle | |
| 6,538,094 B2 * | 3/2003 | Tazzia | 528/53 |
| 6,911,485 B1 | 6/2005 | Kutal et al. | |
| 7,399,819 B2 | 7/2008 | Yamahiro et al. | |
| 7,704,643 B2 | 4/2010 | Cole et al. | |
| 2005/0113474 A1 * | 5/2005 | Kropp et al. | 522/1 |
| 2007/0264440 A1 * | 11/2007 | Katoh et al. | 427/487 |
| 2010/0105794 A1 | 4/2010 | Dietliker et al. | |
| 2010/0183820 A1 | 7/2010 | Seubert et al. | |
| 2010/0234484 A1 | 9/2010 | Schellenberg et al. | |
| 2011/0034012 A1 | 2/2011 | Kobayashi | |
| 2011/0059265 A1 | 3/2011 | Templeman et al. | |
| 2011/0086311 A1 | 4/2011 | Katayama et al. | |

(Continued)

FOREIGN PATENT DOCUMENTS

WO 2005/100482 10/2005

OTHER PUBLICATIONS

Beth A Ficek, Amber M. Thiesen, Alec B. Scranton. Cationic photopolymerizations of thick polymer systems: Active center lifetime and mobility. 2008 (Available Nov. 5, 2007). European Polymer Journal. 44. 98-105.*

*Primary Examiner* — Dah-Wei D Yuan
*Assistant Examiner* — Kristen A Dagenais
(74) *Attorney, Agent, or Firm* — Oblon, McClelland & Neustadt, L.L.P.

(57) ABSTRACT

The invention relates to a method for forming a coating on a substrate material which includes applying one or more layers of a monomer composition to a surface of the substrate. At least one monomer layer comprises a photoinitiator, and at least one monomer layer comprises a photogenerated base precursor. The monomer layer is exposed to a first wavelength of light to initiate polymerization of the monomers. The monomer layer is subsequently exposed to a second wavelength of light to terminate the polymerization.

19 Claims, 2 Drawing Sheets

(56) References Cited

U.S. PATENT DOCUMENTS

2012/0282448 A1* 11/2012 Chretien et al. ............. 428/220

* cited by examiner

TERMINATE-ON-DEMAND CATIONIC POLYMERIZATION METHOD FOR FORMING A TWO-DIMENSIONAL COATING

FIELD OF THE INVENTION

The invention relates to a method for applying a monomer composition to a substrate material initiating polymerization at a first wavelength and terminating polymerization at a second wavelength, to form a polymer layer coating on the substrate.

BACKGROUND OF THE INVENTION

It is known to use polymer coatings on various substrate materials. Typically, these coatings are produced using thermally activated polymerization. Heat is used to generate active centers that polymerize the coatings after a monomer has been applied to a substrate as a liquid. However, thermal polymerization requires large amounts of energy, time and expense to run high temperature ovens for extended periods of time.

It is also known to use photopolymerization to produce polymer coatings on substrates. Photopolymerization reactions are chain reactions which generate free radical or cationic active centers. In photopolymerization, energy from UV or visible light is used to polymerize the monomer. Photopolymerization has a number of advantages including savings in energy and high cure rates without the necessity of solvents. Conventional photopolymerization proceeds by free radical polymerization process.

Photopolymerization of coatings on various substrates has not been successful because of problems with oxygen inhibition. Previously known photopolymerization systems generally have used free radical polymerization to generate free radical active centers. The free radical active centers may react with oxygen to produce unreactive peroxides and hydroperoxides. This results in a decrease in the polymerization rate and a reduction in molecular weight of the polymer. The oxygen inhibition may cause free radical polymerizations to exhibit an incomplete cure resulting in deficient coatings. A typical method for overcoming oxygen inhibition is to purge the system with nitrogen in an attempt to displace the oxygen from the monomer. Coatings having multiple layers would require nitrogen purging for each layer also requiring more than one illumination step.

Additionally, photopolymerization may also exhibit deficiencies in curing systems having pigments. Pigments may be used in a coating to provide color or to cover the surface of a substrate. Pigments may inhibit photopolymerization by directly competing with a photoinitiator absorption. Additionally, pigments may interact with light to scatter photons in multiple directions resulting in increased light attenuation for pigmented coatings.

Photopolymerization may be further disadvantaged by requiring line of sight exposure of the substrate surface coated with a monomer composition. Line of sight exposure and even illumination of a substrate surface becomes especially difficult for substrates having shadow areas or portions that cannot be oriented directly in the line of sight of exposing illumination.

Cationic polymerization has advantages over conventional free radical polymerization techniques. For example, free radical polymerization is negatively affected by the inclusion of pigmented materials that absorb the illumination required to initiate polymerization and/or interfere and/or capture free radical monomers present during polymerization. Such radical trapping requires line of sight curing of substrates. Surfaces of a substrate coated with a monomer composition but not exposed to line of sight curing may not undergo curing and/or may be subject to insufficient curing and thereby form defective and/or only partially polymerized coatings.

Further, coatings formed by free radical polymerization are often subject to a high shrinkage rate. High shrinkage of a two-dimensional polymer coating covering a large substrate detrimentally affects the adhesion of the coating on the substrate surface and likewise may form a coating having a higher tendency to form defects.

In contrast to free radical polymerization, cationic polymerization may include an "living" component such that after an initial illumination and/or formation of cationic active centers the polymerization is self-propagating even in the absence of further illumination. Polymerization may therefore propagate and migrate into portions of a substrate surface that are not directly illuminated or only partially illuminated. For example, if a two-dimensional substrate such as an automotive body panel is coated on both outside and inside surfaces with a monomer composition and the thus-coated automotive panel is illuminated on only one side, i.e., the illuminated side in contrast to the shadow side, polymerization initiated at the illuminated side may propagate to the shadow side and/or portions of the automotive body panel which are not otherwise illuminated with the same degree of intensity as those portions that are in direct line of sight of the illuminating radiation.

Subsequent to photoinitiation of the cationic active centers and polymerization of the cationically polymerized monomers, cationic centers may continue to be present in the resultant polymerized coating. Polymerization may therefore continue to an unnecessary degree and/or for an extent of time that is not desirable.

There is therefore a need in the art for an improved method of forming a pigmented coating by photopolymerization of controlled duration. There is also a need in the art for an improved method of applying and curing a coating that eliminates the need for multiple illumination and/or nitrogen purging.

SUMMARY OF THE INVENTION

Accordingly, the invention relates to a method of producing a polymerized coating on a substrate material. The method is particularly useful for coating objects with a coating having pigments contained therein.

In one aspect, the method includes the steps of applying one or more monomer layers comprising uncured monomer material to the substrate material, at least one monomer layer including a photoinitiator capable of producing cationic active centers and at least one layer comprising a photo-generated base precursor. The layer including the photoinitiator is exposed to a source of UV radiation at a desired wavelength forming cationic active centers. The monomers react in a polymerization reaction forming a cured layered material. Subsequent or during polymerization the photo-generated base precursor is exposed to a source of illumination (e.g., UV light) having a different wavelength than the source of UV radiation used to initiate polymerization to thereby form a photo-generated base which terminates the polymerization reaction.

In a further aspect of the invention the monomer composition includes a precursor to a photo-generated base. Upon illumination at a second wavelength that is different from the first wavelength used to generate a cationically active species from the photoinitiator, the photo-generated base precursor releases and/or forms one or more photo-generated bases. The photo-generated base is preferably an anionic species which may combine with cationic species remaining from cationic polymerization of the monomers and/or photoinitiation of the cationic species. The photo-generated base, upon reaction with a cationic active center, terminates polymerization.

In another aspect, the method includes applying a base coat to the substrate material. A clear coat layer is applied to the base coat layer with the clear coat layer including a photoinitiator capable of producing cationic active centers. The clear coat layer is then exposed to a source of UV radiation at a desired wavelength forming cationic reaction centers. The base coat and clear coat layers react in a polymerization reaction forming a cured layered material.

In an other aspect of the invention a polyether polymer coating is formed by cationic ring opening polymerization. Activation of a cyclic monomer to form a cationic center proceeds by cleavage of the ring, e.g., by reaction of the ring with a cationic center generated when a photoinitiator is illuminated to form a cationic species at a first wavelength, and subsequent reaction of the thus-generated cationic monomer species with the rings of other cyclic monomers.

DETAILED DESCRIPTION OF THE PREFERRED EMBODIMENTS

Figure 1:
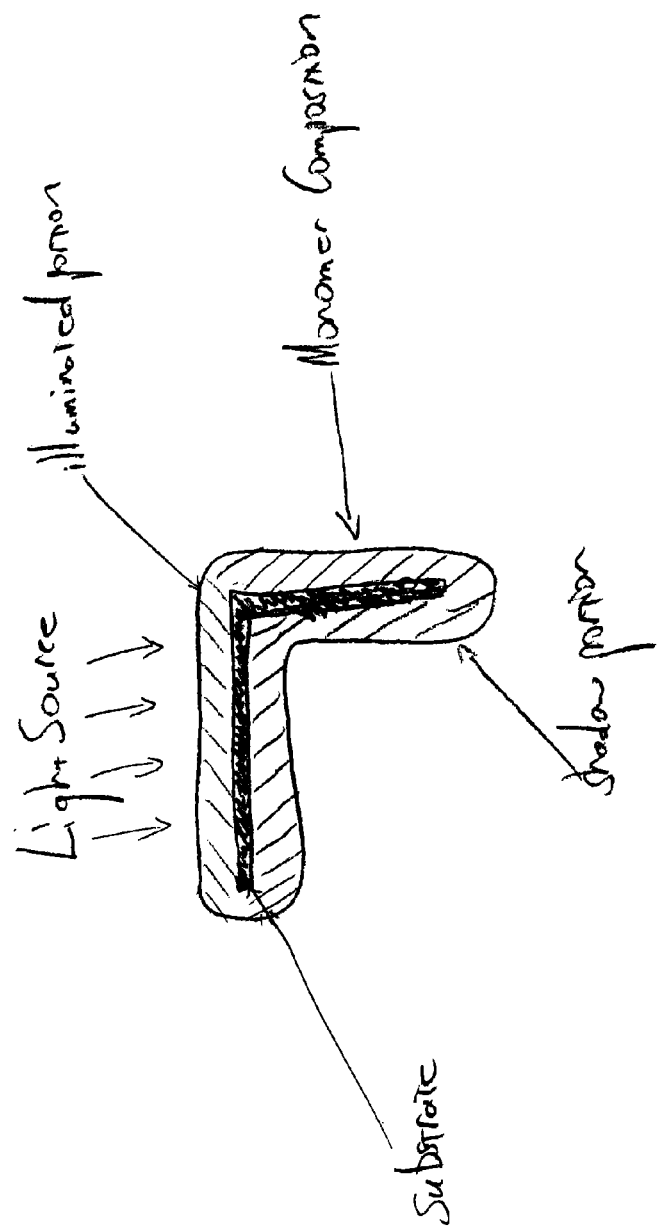
FIG. 1 is a graphic representation of one embodiment of the invention wherein a monomer applied to both sides of a substrate is illuminated only on one side but cures on both the illuminated side and on the shadow side.

Referring to FIG. 1, there is shown graphic representation of a method of forming a coating on a substrate. The method includes applying at least one monomer layer to the substrate material. At least one monomer layer includes a photoinitiator capable of producing cationic active centers upon illumination with light of the appropriate wavelength and a photo-generated base precursor capable of forming an anionic base upon exposure to radiation. The at least one layer including the photoinitiator is exposed to a source of UV radiation at a desired wavelength.

While the graphic representations of FIG. 1 shows a single layer applied to a substrate, it should be realized that a plurality of layers may be applied to a substrate material with at least one of the plurality of layers including a photoinitiator. The at least one layer including the photoinitiator may be exposed to a source of UV radiation at a desired wavelength. All the separate monomer layers of the plurality may react in a polymerization reaction forming a cured layered material. In one aspect, at least one of the layers may include a pigment. The pigment may be contained in the layer including the photoinitiator without affecting the curing of the cured layered material.

Figure 2:
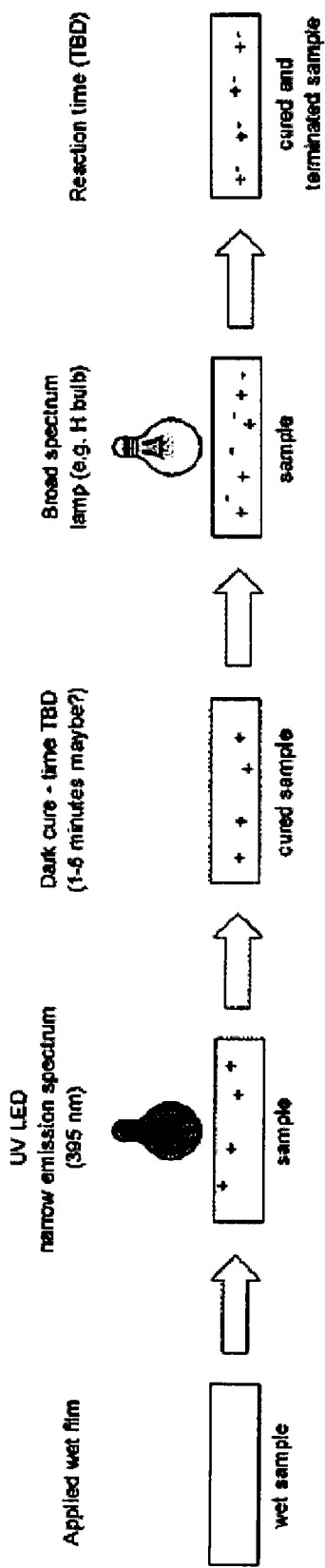
FIG. 2 is a graphic representation of an embodiment of the invention wherein a wet sample, e.g., a substrate coating with a monomer-containing composition comprising a photoinitiator and a photo-generated base precursor, is first illuminated by a first wavelength, then illuminated with a second wavelength to form a substrate having a cured polymer coating.

Referring to FIG. 2, a substrate that has been coated with a monomer-containing composition that comprises a photoinitiator capable of forming a cationically active species and a photo-generated base precursor capable of forming an anionic base, is subjected to a first illumination. The first illumination causes the photoinitiator to generate a cation active species which itself reacts with the monomer to form cationically activated monomers which engage in polymerization and propagation.

Preferably the first illumination is carried out with a wavelength of light that is near the visible region of light. Carrying out first illumination at a near visible wavelength permits handling and subsequent curing of the first-illuminated substrate under conditions that do not require the absence of visible light. This provides numerous advantages for operators in monitoring the first curing action under visible light. After first illumination the coated substrate comprises a monomer-containing composition comprising cationically activated monomer species undergoing polymerization.

The polymerization is preferably a cationic ring opening polymerization whereby one or more cyclic group-containing monomers react with one another in a self-propagating fashion to form a polyether polymer in which monomer units are bonded to one another through ether linkages.

In FIG. 2 after first illumination the coated substrate may be given a cure time sufficient to achieve a desirable degree of polymerization of the monomer-containing composition. Longer cure times permit a greater and/or more full degree of polymerization of the cyclic group-containing monomer species, for example, to form a relatively higher molecular weight polymer product. Relatively lower cure times result in the formation of less completely cured monomer compositions and/or a cured product having polymeric species of relatively low molecular weight.

After achieving a desirable degree of curing, the substrate, now coated with an at least partially cured monomer-containing composition, is subjected to a second illumination at a second wavelength. The second wavelength causes the photo-generated base precursor to form a photo-generated base which is preferably anionic in character.

In one embodiment of the invention the second illumination is carried out with deep UV radiation that is substantially outside the visible region of light. The anionic species formed by the second illumination then combines with and/or reacts with cationically active species or remnants of cationically active species derived from or obtained from the first illumination. Combination of cationic and anionic species forms neutral species having no further capability to initiate and/or propagate cationic polymerization.

In one aspect of the invention polymeric species formed subsequent to the first illumination and during curing after first illumination are terminated with cationic species. After the second illumination the anionic photo-generated base species combine with the cationic terminal groups to form polymer species terminated with neutral groups. The resultant substrate comprises, on at least one surface, a cured polymeric coating having a degree of cure defined at least in part by the time the first illuminated substrate is permitted to cure before second illumination.

The first illumination may use light obtained, for example, from a near-visible region radiation source. Light having a peak wavelength between 100 nm and 400 mm is preferred. Light in the UVC, UVB and/or UVA portions of the spectrum may also or alternately be used for the first illumination. Most preferably the light source provides light having a relatively narrow wavelength distribution and most preferably less than 10%, or less than 5% light in the region of the spectrum utilized for curing in the second illumination. A lamp such as an LED which emits at a narrow, welldefined wavelength is a preferred source for the first illumination. Examples of LEDs include lamps available from Phoseon Technology including the Firefly, Starfire, Firejet, and Fireline lamps. In other embodiments of the invention a conventional light source such as a mercury vapor lamp is used to provide a relatively broad distribution of wavelengths. Certain regions of the light may be removed by use of filters such that the light actually used to illuminate a coated surface is in a relatively narrowly defined spectral range and/or has certain spectral regions completed blocked. The second illumination may use light such as deeper UV light obtained from a broader spectrum source such as Fusion UV Systems I600 with an H or H+ bulb. Light having a peak wavelength between 100 nm and 400 mm is preferred. Light in the UVC, UVB and/or UVA portions of the spectrum may be used for the second illumination. After the first illumination the concern of using a spectral region overlapping the wavelength of light used in the first illumination is not so great and thus the second illumination may use a light source that provides light that overlaps the peak wavelength(s) of the first illumination. Light in the visible region may also be used.

In an embodiment of the invention a coating composition comprising (i) one or more monomer materials, (ii) a photoinitiator capable of initiating a cationic polymerization reaction, and (iii) a photo-generated base precursor capable of forming an anionic base is applied to a substrate and subjected to illumination at a first wavelength. The thus-illuminated monomer composition thereafter comprises a reaction mixture in which the photoinitiator has produced cationic active centers in the monomers which undergo polymerization. After sufficient polymerization of the monomers is achieved the composition is illuminated at a second wavelength at which the photo-generated base precursor forms a photo-generated base comprising an anionic base. The anionic base reacts with the cationic active centers in the monomer composition to thereby terminate polymerization. The inclusion of both a photoinitiator that produces cationic active centers upon illumination at a first wavelength and a photo-generated base precursor that produces an anionic base upon illumination at a second wavelength provides a coating composition in which the degree of polymerization may be adjusted by terminating polymerization on demand. In one aspect of the invention the photo-generated base may act to crosslink two cationically terminated polymer species.

The monomer-containing composition includes one or more pigments and/or dyes. Preferably the monomer-containing composition contains one or more pigments that interfere with the initiation and/or propagation of a free radical polymerization. As used herein, "pigment" or "pigment particle" may generally refer to an additive to the coating composition including a colorant, magnetic particle, alumina, silica, and/or other ceramic or organo-metallic, whether or not such a particulate imparts color. Thus, the present description can be used more generally to describe not only pigment colorants, but other pigments such as organometallics, ferrites, ceramics or the like.

All organic, inorganic pigments, and/or additives known in the art may be incorporated in the coating(s). Examples of inorganic pigments may include titanium dioxide ($TiO_2$) (e.g., white), iron oxide (e.g., red, yellow, magnetic, coated flake), aluminum oxide, iron complexes (e.g., green, blue), or the like. Organic pigments such as quinacridone (e.g., red, purple), carbazole violet, phthalocyanine (e.g., green, blue), carbon black, mica flakes, or azo based compounds (e.g., yellow, orange shade, nickel complex yellow, quinazolinedione-azo yellow, benzimidazolone yellow, orange azo) can also be incorporated into pigments as used herein. Other examples of pigments may include, but are not limited to, indanthrone (e.g., blue), tetrachloroisoindolinone (e.g., yellow), diketopyrrolo-pyrrole (e.g., red), perylene (e.g., maroon, violet), quinacridone (e.g., magenta), vanadate (e.g., yellow bismuth), titanate (e.g., nickel yellow, chrome gold), silicon dioxide, zinc oxide, cerium oxide, talc, barium sulfate, glass, coated glass, cholesteric liquid crystal pigments, other flake-like interference pigments, bismuth oxychloride, calcium carbonate, and clays (e.g., bentonite and montmorillonite). The pigments may added at a concentration of about 0.1 to 50% by weight relative to the total weight of the monomer composition.

Various cationic photoinitiators and cationically curable monomers may be utilized. In one aspect, any photoinitiator capable of initiating a cationic polymerization reaction of the monomers by absorbing light from a predetermined light source may be utilized. Various cationic photoinitiators may include but are not limited to diazonium salts, diaryliodonium salts, triarylsulphonium salts, dialkylphenacyl-sulfonium salts, ferrocenium salts, α-sulphonyloxy ketones, or silyl benzyl ethers. Photoinitiators may also include 5,7-diiodo-3-butoxy-6-fluorone (e.g., H-Nu) which cures in the UV/visible region and are available from SpectraGroup Ltd. When using a photoinitiator having an absorbance only or mainly in the deeper UV region a photosensitizer may be used in combination with the photoinitiator. Examples of photosensitizers include anthracene, thioxanthone, carbazole, benzophenone, organic dyes, derivatives thereof and mixtures thereof.

The photoinitiator may be present in the monomer composition and/or in at least one monomer layer in an amount that is effective or sufficient to enable the monomer to undergo a photopolymerization upon exposure to light of a desired wavelength. In one aspect, the photoinitiator may be present in an amount of from 0.001 to 10 weight %, preferably 0.01 to 5 weight %, preferably 0.1 to 1 weight %, preferably 0.5 to 6 weight % relative to the monomer. In another aspect, the photoinitiator may be present in a preferable amount of from 0.5 to 2 and even more preferably from 0.8 to 1.2 weight % relative to the monomer.

The photo-generated base precursor is not limited so long as the precursor is capable of absorbing light such as UV light at a wavelength that is different from the wavelength of light used to active a photoinitiator to generate a cationically active species. In a preferred embodiment of the invention the precursor to the photo-generated base is a photolatent base. More preferably the precursor is a photolatent tertiary amine.

Examples of photolatent bases are described in K. Dietliker, "Advancements in Photolatent Amines: Expanding the Scope of Photolatent Base Technology," Technical conference proceedings, RadTech UV & EB 2008 Technology Expo & Conference, May 4-7, 2008, Chicago, Ill.; K. Dietliker, "Photolatent Amines: New Opportunities in Radiation Curing," RadTech UV&EB 2004 Technology Expo & Conference, May 2-5, 2004, Charlotte, N.C.; J. D. Schall, "Characterization of High-Performance Adhesives and Coatings by Photorheometry," RadTech UV & EB 2008 Technology Expo & Conference, May 4-7, 2008, Chicago, Ill.; J. Benkhoff, "Novel Effects Beyond Radiation Curing," RadTech UV&EB 2006 Technology Expo & Conference, Apr. 24-26, 2006, Chicago, Ill.; K. Studer, "Photolatent Bases: New Catalyst for UV-Curing of Coatings," RadTech UV&EB 2006 Technology Expo & Conference, Apr. 24-26, 2006, Chicago, Ill.; J. Benkhoff, "Photolatent Effect Additives for Coatings," FutureCoat Proceedings, New Orleans, La., Nov. 1-3, 2006 (2006); C. M. Seubert, "Epoxy Thiol Photolatent Base Clearcoats: Curing and Formulation," J. Coat. Technol. Res., March 2010, DOI 10.1007/s 11998-010-9248-3; and N. Dogan, "A New Generation of UV-A Curable Clearcoats," Nürnberg congress—Creative advances in coatings technology; Apr. 25-26, 2005, Nürnberg; Each of the aforementioned publications is incorporated herein by reference as if each and every genus, sub-family and species of photolatent amine or photo-generated base precursor is explicitly described herein.

Conventional precursors to photo-generated bases such as photolatent amines may have been used as a basis for the initiation of polymerization such as anionic polymerization, such photolatent amines and precursors to photo-generated bases have not previously been used as a basis for terminating a cationic polymerization.

The monomer composition which forms the monomer layer subjected to illumination at first and second wavelengths includes one or more monomers that are capable of generating cationic active centers by reaction with the cationic active centers produced by the photoinitiator to thereby undergo cationic polymerization. As stated above, various cationically curable monomers may be utilized. The monomers preferable include at least one monomer compound having at least one glycidyl group.

In one aspect, the polymerization may be with any monomer or combination of monomers that undergo cationic polymerization. Various monomers that may be cationically polymerized include but are not limited to monofunctional or difunctional epoxies, high molecular weight epoxy oligomers and resins, cyclic sulphides, vinyl compounds such as styrenics, vinyl ethers, cyclic ethers, cyclic formals and acetals, lactones, and siloxanes, preferably glycidyl-substituted compounds. Preferably the monomer has one or more epoxycycloaliphatic groups such as an epoxycyclohexyl group. In one aspect, the monomer component can comprise a combination of cycloaliphatic diepoxide (3,4-epoxy-cyclohexylmethanyl 3,4-epoxycyclohexane-carboxylate) and a glycidyl ether (2-butoxymethyl-oxirane), and limonene dioxide. The desired selection and amounts of monomer may depend upon the desired polymer to be formed on the substrate.

The monomers used in the monomer composition of the invention may include oligomeric species having one or more cyclic terminal groups. For example, a polyester oligomer terminated by glycidyl groups may be used to form a polymer coating having a relatively lower number of ether groups in comparison with a polymer coating that is formed by cationic polymerization of a monomer compound having only terminal glycidyl groups and no polyester oligomer portion. Reducing the amount of ether bonds may improve the resistance of the resulting polymer coating to light and/or degradation by exposure to environmental conditions.

The monomer-containing composition may contain different amounts of the photoinitiator and the photo-generated base precursor. Preferably the photoinitiator is present in a greater amount by weight than the photo-generated base precursor. In embodiments of the invention photoinitiator and the photo-generated base precursor are present in a weight ratio of 1:1, preferably 1:0.8, 1:0.6, 1:0.4, 1:0.2, 1:0.1, 1:0.05, 1:0.01 and preferably 1:0.001% by mass. In another embodiment of the invention the photo-generated base precursor is present in an amount by weight greater than the amount by weight of the photoinitiator. For example, the photo-generated base precursor may be present in an amount of 1:0.8, 1:0.6, 1:0.4, 1:0.2 or 1:0.1 relative to the amount of the photoinitiator.

The monomer composition, e.g., in the form of a paint formulation, can further include a solvent. The solvent can be any solvent composition known to those skilled in the art, illustratively including organic solvents or water. For example, organic solvents such as aliphatics, aromatics, alcohols, ketones, white spirit, petroleum distillates, esters, glycol ethers, and the like can be used. Additives can be included within the paint composition, for example surface tension modifiers, flow modifiers, surface finish modifiers, wet edge modifiers, pigment stability modifiers, antifreeze modifiers, foam control modifiers, catalysts, thickeners, stabilizers, emulsifiers, texture modifiers, adhesion modifiers, flatteners, biocides, additives for weathering protection, such as UV absorbers and hindered amine light stabilizers, and the like.

The monomer layers may be applied to the substrate and other layers using various application methods. Included application methods include spraying, knife coating, brushing, flow coating, dipping, or rolling. In one aspect a preferred method is spray application which may include compressed air spraying, airless spraying, high speed rotation, or electrostatic spray application. The layers applied to the substrate and subsequent layers may have varying thicknesses depending on the application method. In one aspect, the thickness of the monomer layers may be from 5 to 150 micrometers, preferably between 40 to 60 micrometers.

The method of the invention may be utilized in base coat and clear coat systems. In one aspect, a substrate may include steel having an electrocoated layer applied thereon. A first base coat layer may be applied to the substrate. The base coat layer may include various monomers, solvents and pigments. A clear coat layer may be applied to the base coat layer with the clear coat including the photoinitiator. The clear coat may then be exposed to a source of UV radiation at a desired wavelength such that both the clear coat layer and base coat layer are cured in a polymerization reaction.

In the process of the invention at least one monomer-containing coating composition applied to a substrate surface must contain a photoinitiator capable of generating an active species. In certain embodiments of the invention a substrate may be coated with multiple monomer-containing compositions only one of which or less than all of which comprise a photoinitiator capable of generating a cationic species. The cationic species generated in a single layer may propagate to other layers after first illumination to cause polymerization in other layers.

Likewise, at least one layer of a monomer-containing composition applied to the surface of a substrate during the process of the invention must include a photo-generated base precursor. In aspects of the invention the photo-generated base may migrate and/or propagate to other monomer layers present on the substrate surface which contain cationically activated monomer species or cationically terminated polymers but when initially applied did not contain a photo-generated base precursor.

In a preferable embodiment of the invention each monomer composition applied to a substrate surface comprises a photo-generated base precursor. In this embodiment of the invention the inclusion of a photoinitiator capable of generating a cationic active species is only necessary in a single monomer layer. While cationic polymerization may propagate through multiple layers, preferably termination of polymerization in particular layers by one or more photo-generated bases does not migrate and/or propagate to any substantial degree to any layer adjoining the monomer composition comprising the photo-generated base precursor.

In a preferable embodiment of the invention a polyether polymer coating is formed by cationic ring opening polymerization. In contrast conventional free radical polymerizations typically form acrylic films and/or coatings. In ring opening polymerization a cyclic monomer, e.g., a monomer containing a group in the form of a ring, forms a reactive center such as a cationic center which reacts with other monomers. Activation of a cyclic group-containing monomer to form a cationic center proceeds by cleavage of the ring, e.g., by reaction of the ring with a cationic center generated when a photoinitiator is illuminated to form a cationic species at a first wavelength, and subsequent reaction of the thus-generated cationic monomer species with the rings of other cyclic monomers. Contrary to films formed by free radical polymerization, films formed by ring opening polymerization are not disadvantaged by high shrinkage.

In another embodiment of the invention different monomer-containing compositions which differ in any of the monomer species, the photoinitiator and/or the photo-generated base precursor are successively or concurrently applied to a substrate. Illumination at a first wavelength initiates cationic polymerization in all of the applied layers. Subsequent second illumination may cause a first photo-generated base precursor to terminate polymerization in one layer but not all layers. Subsequent illumination at a third wavelength different from the first and second wavelengths may then terminate polymerization of one or more different monomer-containing layers. In this manner a multiple layer polymer coating can be formed on a substrate wherein different layers comprise different types of polymers having different degrees of polymerization.

In a particularly preferable embodiment of the invention only a single monomer-containing composition is applied to a substrate prior to first and second illumination. The single monomer-containing composition comprises the photoinitiator and the photo-generated base precursor in addition to any other additives desired to be present in the finished polymer coating including pigments, dyes, stabilizers, anti-cratering additives, UV absorbers and the like.

In a still further preferable embodiment of the invention a substrate is coated with a plurality of monomer-containing compositions each of which comprises at least one photoinitiator, at least one photo-generated base precursor and at least one monomer. The monomer, photoinitiator and precursor of each of the layers separately applied to the substrate may be the same and said compositions may differ, for example, in additives. In this embodiment of the invention a substrate surface can be coated with a plurality of pigmented layers, each comprising pigments of different color and/or composition. The resultant polymerized coating comprises a plurality of separately pigmented layers providing exceptional depth and luster to the finished coated substrate.

In a still further embodiment of the invention the precursor to the photo-generated base may be activated to release the photo-generated base upon exposure to radiation other than light, e.g., radiation. For example, exposure of a wet coating to alpha radiation, electron bombardment or another type of radiation to generate a photo-generated base may be an effective means to terminate cationic polymerization.

In a preferable embodiment of the invention first illumination at the first wavelength is carried out with a non-focused lamp. Such lamps may expose the substrate surface to different degrees and different intensities of the first wavelength of light. The resulting cationically activated monomers are nonetheless able to provide an even and uniform cure across a two-dimensional substrate surface because of the living nature of the cationic ring opening polymerization.

In one embodiment of the invention the photo-generated base is self-propagating in the same manner as the cationically active centers of the monomers. In this embodiment of the invention the photo-generated base migrates and/or propagates to portions of a coated substrate which are not fully illuminated and/or are in a shadow portion of the substrate exposed to illumination at the second wavelength.

In another embodiment of the invention the photo-generated base does not self-propagate through all portions including shadow areas of the coated substrate but is present in only those portions of the coating composition that are directly illuminated with a second wavelength. Those portions of the coating in a shadow portion and/or otherwise not directly illuminated at the second wavelength and/or which do not otherwise comprise a photo-generated base precursor or the photo-generated base, cationic polymerization at these areas is self-terminated over time and/or terminated by exposure to the elements. Any differences in surface characteristics of portions of the coating which are directly illuminated at first and second wavelengths and portions of the coating which are only partially illuminated at first and/or second wavelengths and/or are present in a shadow portion of the substrate, are immaterial because such portions of the substrate are not subject to the quality and appearance requirements of the exterior, e.g., outside, portions of the coated substrate which are directly viewable by a consumer.

The process of the invention forms a substrate having a two-dimensional polymeric coating that is essentially continuous in two directions. In a preferred embodiment the substrate is an automotive panel. Automotive panels include, for example, fenders, roof assemblies, trunk lids and hood lids. The substrate may have a metallic or synthetic polymer surface. For example, the substrate may be a thermoformed acrylic, a thermoset polyester, a polyolefin etc.

After polymerization the coating present on the substrate surface is continuous in at least two dimensions for at least 2 millimeters, preferably at least two centimeters, more preferably at least 20 centimeters in two directions. In another aspect of the invention the polymeric coating is continuous over all surfaces, including both the exterior surfaces of an automotive panel and its shadow surfaces, even those surfaces that are normally not visible for inspection by a consumer and/or are covered with cosmetic detail such as door panels and/or carpeting.

Published U.S. Patent Application U.S. 2011/0059265 is incorporated herein by reference in its entirety.

The invention claimed is:

1. A method of forming a coating on a substrate, comprising:

applying at least one layer of a monomer composition to at least one surface of the substrate to form a coated substrate having a monomer layer, wherein the monomer composition comprises (i) at least one monomer capable of cationic polymerization, (ii) at least one photoinitiator capable of initiating cationic polymerization, and (iii) at least one photo-generated base precursor;

exposing the monomer layer on the coated substrate to a first wavelength of light to initiate a cationic polymerization of the monomer; then exposing the monomer layer to a second wavelength of light to form a photo-generated base from the photo-generated base precursor, wherein the photo-generated base comprises at least one anionic group, to terminate the cationic polymerization and form the coating on the substrate, wherein the coating comprises a polymer of polymerized units of the monomer.

2. The method of claim 1, wherein the monomer has at least one epoxide group.

3. The method of claim 1, wherein the monomer has at least one glycidyl group.

4. The method of claim 1, wherein the first wavelength is nearer to the visible wavelength than the second wavelength.

5. The method of claim 1, wherein the photo-generated base precursor is a photolatent amine.

6. The method of claim 1, wherein the photo-generated base precursor is a photolatent tertiary amine.

7. The method of claim 1, wherein the monomer composition further comprises at least one pigment.

8. The method of claim 1, wherein the substrate is an automotive body panel.

9. The method of claim 1, wherein the applying comprises:
   first applying a first monomer layer to the substrate, then applying a second monomer layer to the substrate, wherein at least one of the first and the second monomer layers does not comprise the photoinitiator.

10. The method of claim 9, wherein both the first monomer layer and the second monomer layer comprise the photo-generated base precursor.

11. The method of claim 1, further comprising:
   applying a clear coat layer to the coating.

12. The method of claim 1, wherein the monomer composition comprises at least one glycidyl-functionalized oligomer.

13. The method of claim 1, wherein the coating has a thickness of from 5 to 150 microns.

14. The method of claim 1, wherein the photoinitiator is at least one selected from the group consisting of a diazonium salt, a diaryliodonium salt, a triarylsulphonium salt, a dialkylphenacylsulfonium salt, a ferrocenium salt, an α-sulphonyloxy ketone, and a silyl benzyl ether.

15. The method of claim 1, wherein the photoinitiator and the photo-generated base precursor are present in the monomer composition in a weight ratio of from 1:1 to 1:0.1.

16. The method of claim 1, further comprising:
   after exposing the monomer layer at the first wavelength of light, curing the monomer layer for from 0.1 minute to 1 hour.

17. The method of claim 1, wherein during the applying both a front surface and a back surface of the substrate are covered with the monomer composition.

18. The method of claim 17, wherein during the exposing one or more portions of a surface of the substrate covered with the monomer layer is not directly illuminated by the first wavelength.

19. The method of claim 1, wherein the monomer composition further comprises:
   one or more photosensitizers.

* * * * *